(No Model.)

T. CORRIS.
FLANGE UNION.

No. 280,353.   Patented July 3, 1883.

Witness,
H. W. Tibbitts.
E. W. Laird.

Inventor:
Thomas Corris
By Geo. W. Tibbitts Atty

UNITED STATES PATENT OFFICE.

THOMAS CORRIS, OF CLEVELAND, OHIO.

FLANGE-UNION.

SPECIFICATION forming part of Letters Patent No. 280,353, dated July 3, 1883.

Application filed February 23, 1883. (No model.)

*To all whom it may concern:*

Be it known that I, THOMAS CORRIS, of Cleveland, in the county of Cuyahoga and State of Ohio, have invented new and useful Improvements in Flange-Unions, of which the following is a specification.

These improvements relate to the peculiar construction of the flanges constituting certain parts of the union, whereby greater strength is attained, together with greater ability to resist torsion-strain; and they consist in making an intermediate annular flange between the outer and inner flanges, making the union capable of resisting greater strain, as above stated.

Figure 2:
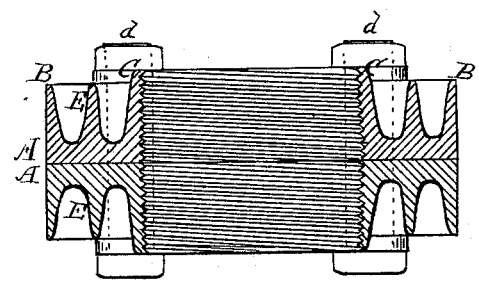
Figure 1:
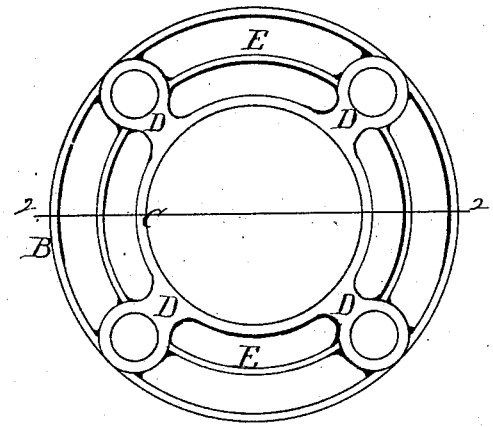

In the accompanying drawings, Figure 1 is a side view, and Fig. 2 is a cross-section in line 2 2 on Fig. 1.

A A are two plates having their contact-faces evenly finished, and having an annular flange, B, at their outer edge. Their central part is made open, and they are also provided with a deep annular flange, C, at the edge of said opening. The inside surface of said flange is screw-threaded for the purpose of attaching said plates to the ends of pipes for uniting them. At suitable intervals around said plates are made solid walls D D between said flanges B C, having bolt-holes for *d* for securing said plates together. Between said walls D, and midway between said flanges B C, is made a third flange, E. The objects and purpose of this intermediate flange are to give additional strength to the plates. This is accomplished by so locating and combining the said flange that the strain upon it is edgewise. In this manner it is capable of resisting much greater strain than radiating webs. In screwing the pipes into these union-plates, which must be tight, the torsion-strain is liable to twist and bend the plates, which would cause an unevenness of their contact-surfaces, making an imperfect joint, liable to leakage. This danger and liability my improvement will overcome.

Having described my invention, I claim—

The herein-described flange-union, consisting of the plates A A, each having outer flange, B, inner screw-threaded flange, C, and intermediate flange, E, as shown and described.

THOMAS CORRIS.

Witnesses:
E. W. LAIRD,
GEO. W. TIBBITTS.